Figure 1:
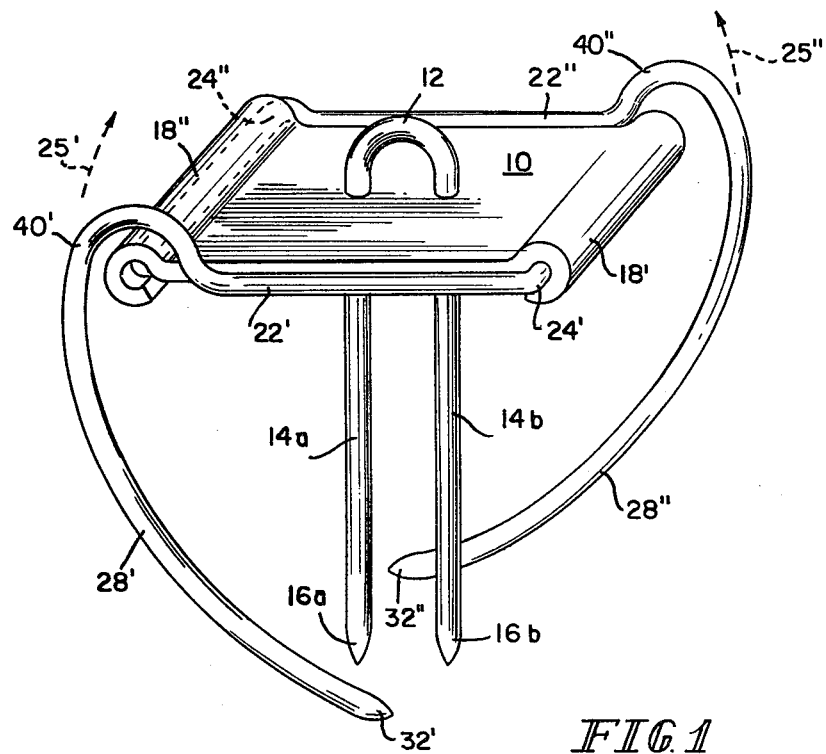

United States Patent [19]

Schrougham

[11] 4,144,843
[45] Mar. 20, 1979

[54] SELF-LOCKING ANCHOR STAKE

[76] Inventor: Benton Schrougham, 243 S. 25th St., Beech Groove, Ind. 46107

[21] Appl. No.: 633,450

[22] Filed: Nov. 19, 1975

[51] Int. Cl.² ............................................. A01K 3/00
[52] U.S. Cl. ................................................ 119/121
[58] Field of Search ...................... 119/121, 117, 114; 52/155–165; 135/15 PE; 248/156

[56] References Cited
U.S. PATENT DOCUMENTS 3,485,137  12/1969  Clements ............................. 248/156

Primary Examiner—Louis G. Mancene
Assistant Examiner—Robert P. Swiatek
Attorney, Agent, or Firm—Jenkins, Coffey & Hyland

[57] ABSTRACT

A self-locking anchor stake to which an animal may be tethered, comprising a first member having a tethering or hitching ring or pin thereon, a second stake member attached to the first member and adapted for driving into the earth to position the first member, and a pair of third members hingedly attached to the first member and having stake portions, each describing an arc of a circle with its center at the hinge connection of the third member to the first member. The second member is driven into the ground. The stake portion of each third member is then driven into the ground and crosses the plane of the second member to grip the earth between the second member and the stake portion of each third member and to lock the anchor stake firmly in position in the earth.

2 Claims, 1 Drawing Figure

SELF-LOCKING ANCHOR STAKE

This invention deals with anchor stakes for hitching or tethering animals and, more specifically, with a self-locking anchor stake.

There are several well-known types of hitching or tether stakes. Examples of such stakes are found in the following U.S. patents: U.S. Pat No. 344,683 issued June 29, 1886 to S. B. Sherer and entitled Tether Stake; U.S. Pat. No. 425,385 issued Apr. 8, 1890 to W. W. McKay and entitled Hitching Anchor; U.S. Pat. No. 824,182 issued June 26, 1906 to F. Knoff and entitled Stake Pin; and U.S. Pat. No. 2,812,743 issued Nov. 12, 1957 to E. G. Dustin and entitled Tie-out Stake.

It is an object of the present invention to provide a self-locking anchor stake which is an improvement over the prior art anchor stakes of the aforementioned patents. The improved anchor stake comprises a first member having hitching pin or staple apparatus thereon and a second stake member fixedly attached to the underside of the first member and adapted for being driven into the ground. A pair of third members are provided. Each includes a generally straight arm portion which is attached by a hinge at one end to the first member and, at the opposite end of the straight arm portion an arcuately curved stake portion adapted for being driven into the ground. The second stake member defines a plane which extends beneath the first member generally perpendicularly thereto. In use, the second member is driven into the ground until the first member is approximately flush with the ground. Each third member is then pivoted about the axis of its hinged connection to the first member and the arcuately curved stake portion of the third member is driven into the ground. The arcuately curved portion is of sufficient length that it crosses the plane defined by the second member. The stake is thereby locked into the ground by capturing earth between the second stake member and the curved stake portion of the third member.

Other and further objects of the present invention will become obvious to those skilled in the art to which the invention relates by reference to the following specification and accompanying FIG. 1 which illustrates an embodiment of the invention.

In the invention illustrated in FIG. 1, a tethering ring 12 is provided on the upper surface of first member 10, and second members 14a, 14b extend perpendicularly from the underside thereof. Second members 14a, 14b terminate in points 16a, 16b, respectively. At the opposite ends of first member 10 are two hinge portions 18', 18". Two third members, 22', 22" are provided, each having a hinge portion 24', 24", engaging, respectively, hinge portions 18', 18". Each of third members 22', 22" terminates in an arcuate tine 28', 28", respectively. Tines 28', 28" pivot about the axes of hinged portions 18', 24', 18", 24", respectively, as indicated by arrows 25', 25". Two bends, 40', 40" are formed in third members 22' and 22", respectively, where tines 28', 28" are connected to the generally straight portions of third members 22', 22", respectively.

In operation, second members 14a, 14b are driven into the ground until the underside of first member 10 is flush with the ground. Then, third members 22', 22" are pivoted about their respective hinge axes in the directions opposite arrows 25', 25" and tines 28', 28" are driven into the ground until they reach the positions illustrated in FIG. 1. In these positions, points 32', 32" cross planes extending through second members 14a, 14b, respectively, which planes are perpendicular to the plane which is common to second members 14a, 14b. An animal can then be tethered to tethering ring 12. Additional animals may be tethered to the anchor stake of FIG. 1 at points 40', 40".

As can be appreciated, the generally arcuate curves of the tines 28', 28" allow the tines to be driven into the earth by, e.g., pounding with a mallet. The radii of curvature of these tines with respect to the hinge portions 24', 24", illustratively might be about six inches.

As was previously stated, the second members 14a, 14b are driven into the ground to a sufficient depth so that the first member 10 is flush therewith. Since the tethering ring 12 does not project above members 14a–b to a great extent, hazards such as tripping over the tethering ring 12 or damaging yard equipment thereon are thereby avoided.

Of course, it is to be understood that the self-locking anchor stake thus disclosed can be used for other purposes besides tethering animals. Anchor stakes make excellent tie-downs for various applications such as tie-downs for small aircraft. They have the advantages of being easily installed, easily removed and providing firm anchorage when they are in the ground.

As can be seen, the self-locking anchor stake provides a first member, a second member projecting from the underside of the first member and adapted for driving into the earth, and a pair of third members, each hingedly connected to the first member and having a generally arcuate stake portion. The second member is driven into the ground until the first member is generally flush with the ground. Each third member is then pivoted about its respective hinge and its stake portion is driven into the ground and crosses a plane defined by the second member, thereby capturing earth therebetween and firmly locking the anchor stake in the earth.

I claim as my invention:

1. A self-locking anchor stake comprising a generally horizontally extending plate including tethering means extending upwardly therefrom and second, third and fourth members for inserting into the earth, said second member being rigidly attached to said plate and defining a downwardly extending plane perpendicular to the plane of the plate, said plate having two side edges and two end edges, and each of said third and fourth members including a first generally straight portion hingedly connected to said plate for movement with respect thereto and a second portion at the end of the first portion remote from the hinge, the second portion describing an arc of a circle, the center of which generally coincides with the axis of the hinge for insertion into the earth for intersecting the plane of said second member for retaining said stake firmly in the earth, one of said third and fourth members being hingedly connected at each of said end edges of said plate.

2. A self-locking anchor stake comprising first tethering means for retaining an animal, said first tethering means including a generally flat, horizontal plate having a low-profile tethering attachment projecting upwardly therefrom, and second, third and fourth means for inserting into the earth, said second means being fixedly connected to said plate and defining a plane projecting downwardly perpendicular to said plate, said plate having two side edges and two end edges, and each of said third and fourth means comprising a first portion hingedly connected at one end to the plate, the first portion extending generally radially from the hinged connection, and a second portion at the end of the first portion remote from the hinge, the second portion describing an arc with its center on the axis of the hinge for insertion into the earth in intersecting relationship with said downwardly extending plane for firmly fixing the stake in the earth, one of said third and fourth means being hingedly connected at each of said end edges to said plate.

* * * * *